United States Patent
Saito

(10) Patent No.: US 6,879,453 B2
(45) Date of Patent: Apr. 12, 2005

(54) METHOD OF MAGNETIC TRANSFER TO MAGNETIC RECORDING MEDIUM HAVING TWO RECORDING LAYERS AND THE MAGNETIC RECORDING MEDIUM THEREOF

(75) Inventor: Akira Saito, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 161 days.

(21) Appl. No.: 10/243,964

(22) Filed: Sep. 13, 2002

(65) Prior Publication Data

US 2003/0072095 A1 Apr. 17, 2003

(30) Foreign Application Priority Data

Sep. 14, 2001 (JP) ........................................ 2001-279907

(51) Int. Cl.⁷ ................................................. G11B 5/86
(52) U.S. Cl. .......................................................... 360/17
(58) Field of Search ............................. 360/15, 16, 17; 428/694

(56) References Cited

U.S. PATENT DOCUMENTS 5,367,508 A * 11/1994 Haba ....................... 369/13.17
2002/0186488 A1 * 12/2002 Nishikawa et al. ........... 360/17

* cited by examiner

Primary Examiner—Sinh Tran
Assistant Examiner—Daniell L. Negrón
(74) Attorney, Agent, or Firm—Rossi, Kimms & McDowell

(57) ABSTRACT

A method of magnetic transfer allows transfer of magnetic signals independently to two recording layers included in a magnetic recording medium. The coercive force Hc1 of an upper recording layer, the coercive force Hc2 of a lower recording layer formed below the upper recording layer, the strength Hex2 of a first transfer magnetic field, and the strength Hex1 of a second transfer magnetic field are set so that the following relations hold true: Hc1<Hc2, Hex1<Hex2, Hc1<Hex2, and Hex1<Hc2. The first transfer magnetic field Hex2 is applied to the recording medium to transfer magnetization patterns exclusively to the lower recording layer and to uniformly magnetize the upper recording layer. The second transfer magnetic field Hex1 is applied to the recording medium to transfer magnetization patterns exclusively to the upper recording layer 1a, while keeping the magnetization patterns in the lower recording layer 1b unaffected. A first and second master disks having different magnetization patterns can be applied to record different data in the upper and lower recording layers.

10 Claims, 7 Drawing Sheets

METHOD OF MAGNETIC TRANSFER TO MAGNETIC RECORDING MEDIUM HAVING TWO RECORDING LAYERS AND THE MAGNETIC RECORDING MEDIUM THEREOF

BACKGROUND

A new servo writing technique that magnetically transfers servo data for positioning a magnetic head for writing and reading data to a magnetic recording medium has been attracting much attention. For facilitating the new servo writing technique, the servo data is written in a form of soft magnetic patterns, shaped with lines or islands and embedded in the surface portion of a master disk. The new servo writing technique magnetically transfers the servo data to the surface of the magnetic recording medium by positioning the master disk in tight contact with or in close proximity to the magnetic recording medium and by applying a magnetic field from the outside. Since the new servo writing technique transfers the position data (servo pattern) for controlling the magnetic head of a hard disk drive (HDD) using a magnetic film efficiently in a very short time, the new servo writing technique has been expected to drastically reduce the manufacturing costs of the HDD, to improve the recording density of the HDD, and to create new additional values for the HDD.

FIG. 7(a) is a cross sectional view showing a step of conventional magnetic transfer. FIG. 7(b) is another cross sectional view showing another step of conventional magnetic transfer. Referring now to FIG. 7(a), a magnetic recording medium (magnetic disk) 1 is magnetized uniformly to the right-hand side of the figure (circumference direction of the magnetic recording medium) 6 by an external magnetic field Hex, which is much higher than the coercive force Hc of the magnetic recording medium 1, and applied from a permanent magnet 4 moving in the circumference direction 6 of the magnetic recording medium 1 with a certain spacing kept therebetween (the step of initial magnetization). In FIG. 7(a), a yoke 5 made of a soft magnetic material is shown. The yoke 5 and the permanent magnet 4 constitute a ring head.

Referring now to FIG. 7(b), a master disk 3 is positioned in close proximity to or in close contact with the magnetically initialized magnetic recording medium 1. The master disk 3 includes magnetic layers 3a (Co soft magnetic layers) scattered and embedded in the surface portion 3b of the master disk 3. Magnetic transfer is conducted by applying an external magnetic field Hex to the direction 7 opposite to the direction 6 of the external magnetic field Hex applied for the initial magnetization from the permanent magnet 4 moving above the master disk 3 positioned in close proximity to or in close contact with the magnetic recording medium 1.

The magnetic transfer process will be described below more in detail. The leakage magnetic field (the direction thereof being the same as the direction of the magnetic field for magnetic transfer and opposite to the direction of the magnetic field for the initial magnetization) from the moving permanent magnet 4 reaches the magnetic layer in the surface portion of the magnetic recording medium 1 through the surface portion 3b of the master disk 3. The leakage magnetic field that has reached the surface portion of the magnetic recording medium 1 inverts the initial magnetization, resulting in recorded magnetization with a high coercive force. In the embedded magnetic layers 3a, the leakage magnetic field expands parallel to the surface of the master disk 3, i.e., along the paths with lowest magnetic resistance. Since the leakage magnetic field hardly reaches the magnetic layer in the magnetic recording medium 1 through the embedded magnetic layers 3a, the initial magnetization remains without being inverted in the portions of the magnetic layer of the magnetic recording medium 1 below the embedded magnetic layers 3a. Thus, a negative pattern of the embedded magnetic layers 3a is transferred to the magnetic recording medium 1. The magnetic transfer technique described above does not utilize the leakage magnetic fields from the embedded magnetic layers 3a for magnetizing the magnetic recording medium 1 but utilizes the embedded magnetic layers 3a as a mask for interrupting the leakage magnetic field from the permanent magnet 4. In short, the leakage magnetic field from the permanent magnet 4 selectively magnetizes the magnetic recording medium 1 through the surface portion 3b of the master disk 3. See for example, Japanese Unexamined Laid Open Patent Application 2001-34939.

Now the relation between the strength Hex of the external magnetic field for magnetic transfer and the coercive force Hc of the magnetic recording medium 1 will be described. As described above, fine soft magnetic patterns 3a are embedded in the surface of the master disk 1. FIG. 8(a) shows cross sectional views illustrating the distribution of the magnetic field around the soft magnetic patterns 3a. FIG. 8(b) is a graph illustrating the distributions of the parallel components of the magnetic fluxes on the magnetic recording medium 1.

As illustrated in FIG. 8(a), the magnetic fluxes converge to the soft magnetic patterns 3a in the regions where the soft magnetic patterns 3a are located. The magnetic fluxes, once converged to the soft magnetic patterns 3a, diverge from the soft magnetic patterns 3a into the regions where no soft magnetic pattern 3a is located. The magnetic field Ha beneath the central portion of the soft magnetic pattern 3a is lowest since the magnetic fluxes converge beneath the central portion of the soft magnetic pattern 3a. The magnetic field Hb at both ends of the soft magnetic pattern 3a is the highest since the magnetic fluxes converge to both ends of the soft magnetic pattern 3a. The magnetic field Hg at the center of the region between the adjacent soft magnetic patterns 3a is lower than the magnetic field Hb at both ends of the soft magnetic pattern 3 since the once converged magnetic fluxes diverge at the center of the region between the adjacent soft magnetic patterns 3a.

FIG. 8(b) plots the relations between the external magnetic field Hex and the above described magnetic fields Ha, Hb, and Hg. Due to the existence of the soft magnetic patterns 3a, the magnetic fields Hb and Hg increase with increasing magnetic field Hex, always keeping higher values than that of the corresponding external magnetic field Hex. Therefore, the curves for the magnetic fields Hb and Hg are always above the broken line (having the gradient of 1) on the graph. In contrast, the magnetic field Ha is always lower than the corresponding external magnetic field Hex due to the existence of the soft magnetic patterns 3a. The curve for the magnetic field Ha is always below the broken line. The reference symbol Ht in FIG. 8(b) designates the magnetic field strength at which the soft magnetic patterns 3a saturate magnetically. Therefore, the magnetic field Ha applied to the magnetic recording medium 1 beneath the soft magnetic patterns 3a increases sharply, when the external magnetic field Hex applied is higher than the magnetic field Ht.

Therefore, the magnetic transfer to the magnetic recording medium 1 with the coercive force Hc can be facilitated by applying an external magnetic field Hex with the following relations to the magnetic recording medium 1: Hb>Hc, Hg>Hc, and Ha<Hc. The conventional magnetic transfer technique described above is effective for the magnetic transfer to a magnetic recording medium having only a single recording layer. It is impossible, however, for the conventional magnetic transfer technique to transfer the soft magnetic patterns embedded in a master disk independently to two recording layers included in a magnetic recording medium.

Accordingly, there is a need to provide a magnetic transfer method that transfers magnetic signals independently to two recording layers included in a magnetic recording medium, along with a magnetic recording medium that has two recording layers that can transfer different magnetic signals independently to the respective recording layers. The present invention addresses this need.

SUMMARY OF THE INVENTION

The present invention relates to a method of transferring magnetic data to a magnetic recording medium having two recording layers, and the recording medium thereof. More specifically, the present method can be used to write servo data for positioning a magnetic head for writing and reading data to the surface of a magnetic recording medium in a hard disk drive.

One aspect of the present invention is a recording medium. Such a recording medium has a first magnetic recording layer and a second magnetic recording layer below the first magnetic recording layer. The magnetic recording medium can further include one or more isolation layers disposed between the first and second magnetic recording layers. The isolation layers can be made of a nonmagnetic material.

Another aspect of the present invention is a method of magnetically transferring data to the recording medium described above. The method can include the following steps. The magnetic recording medium is magnetically initialized by applying an initializing magnetic field parallel to the magnetic recording medium. A first master disk is positioned in close proximity to or in close contact with the magnetic recording medium. The master disk can include a nonmagnetic substrate, including soft magnetic layers embedded in the surface portions thereof and shaped with respective line patterns or respective island patterns indicating first data. A first transfer magnetic field is applied to the first master disk and the magnetic recording medium opposite to the direction of the initializing magnetic field to transfer the first data from the first master disk to the second magnetic recording layer.

The method can further include the step of applying a second transfer magnetic field to the first master disk and the magnetic recording medium in the same direction as the direction of the initializing magnetic field to transfer the first data from the first master disk to the first magnetic recording layer. The method can further include the step of positioning a second master disk in place of the first master disk. The second master disk is also positioned in close proximity to or in close contact with the magnetic recording medium, and can include a nonmagnetic substrate, including soft magnetic layers embedded in the surface portion thereof and shaped with respective line patterns or respective island patterns indicating second data. A second transfer magnetic field can be applied to the second master disk and the magnetic recording medium in the same direction as the direction of the initializing magnetic field to transfer the second data from the second master disk to the first magnetic recording layer.

The strength of the first transfer magnetic field and the strength of the second transfer magnetic field can be different from each other. Moreover, the coercive force of the first magnetic recording layer and the coercive force of the second magnetic recording layer can be different from each other. In this respect, the coercive force Hc1 of the first magnetic recording layer, the coercive force Hc2 of the second magnetic recording layer, the strength Hex2 of the first transfer magnetic field, and the strength Hex1 of the second transfer magnetic field can be set to have the following relations: Hc1<Hc2, Hex1<Hex2, Hc1<Hex2, and Hex1<Hc2.

The first data can be servo signals, and the patterns of the soft magnetic layers in the first master disk and the patterns of the soft magnetic layers in the second master disk can be different from each other so that the servo signals recorded in the second magnetic recording layer are not erased during recording the second data in the first magnetic recording layer.

DETAILED DESCRIPTION

Now the invention will be described hereinafter in detail with reference to the accompanied drawing figures that illustrate the preferred embodiments of the invention.

Figure 1:
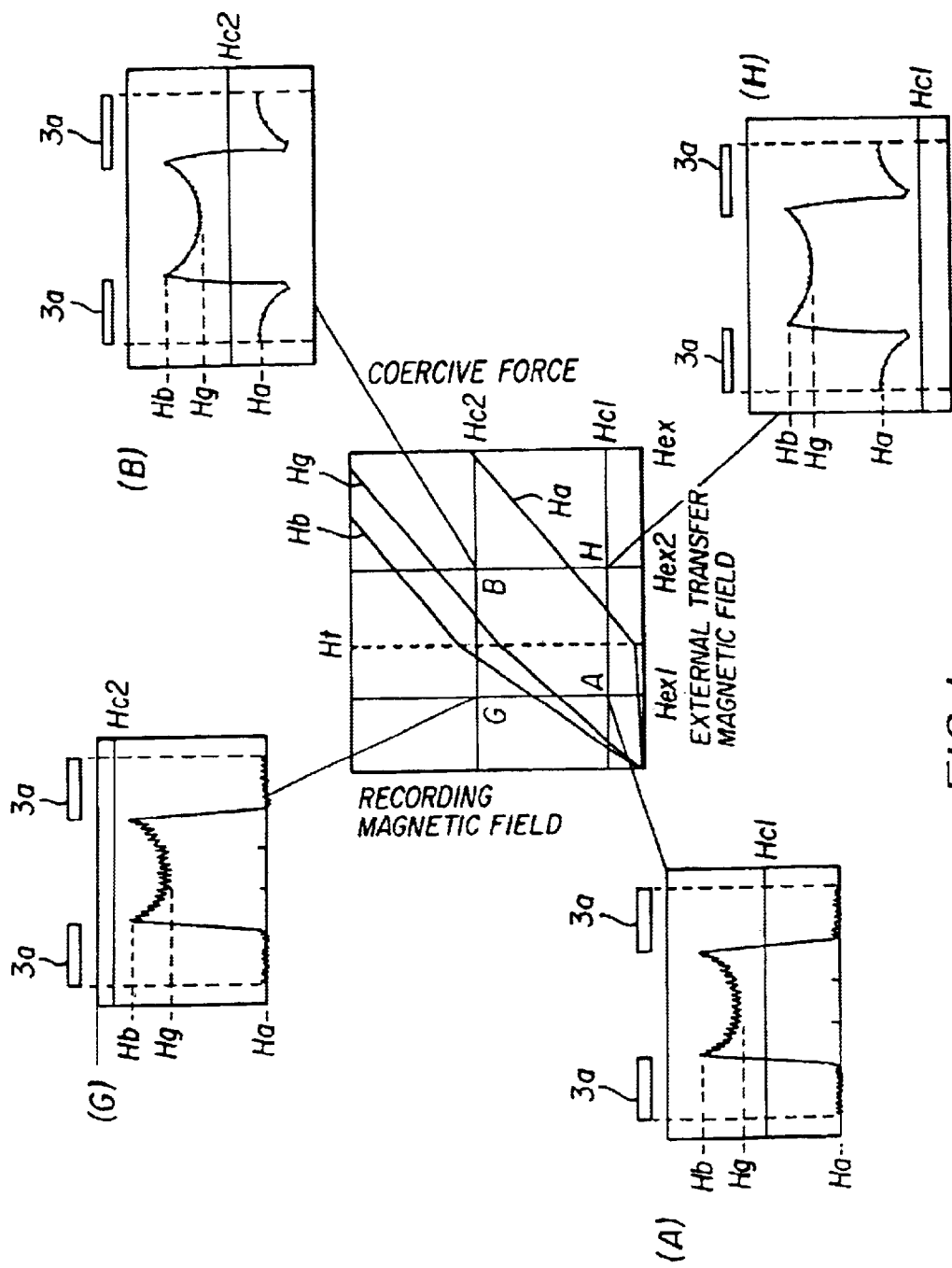
FIG. 1 is graphs schematically illustrating how the soft magnetic patterns embedded in the master disk are transferred independently to two recording layers included in a magnetic recording medium, with their coercive forces Hc1 and Hc2 being different from each other, when different external magnetic fields Hex1 and Hex2 are applied to the magnetic recording medium.

How the magnetic transfer is effected when two external magnetic fields having different strengths Hex1 and Hex2 are applied to a magnetic recording medium with two recording layers having different coercive forces Hc1 and Hc2 will be described. Here, it is assumed that the relations Hc1<Hc2, Hex1<Hex2, Hc1<Hex2, and Hex1<Hc2 hold true, and that Hc1, Hc2, Hex1, and Hex2 are located as described on the transfer maps of FIG. 1.

Figure 8A:
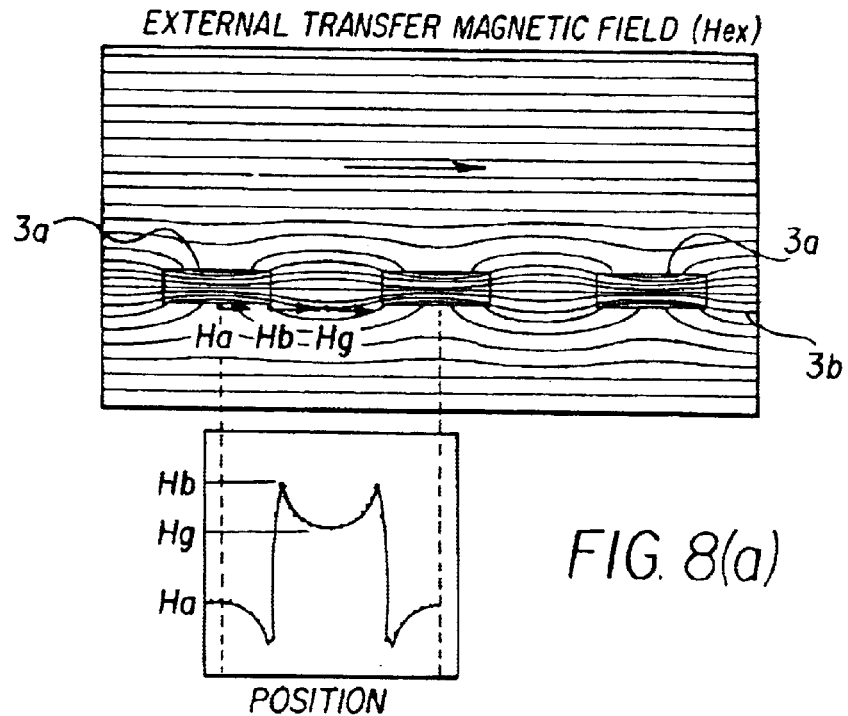
FIG. 8(a) is schematic cross sectional views illustrating the distribution of the magnetic field around the soft magnetic patterns.
Figure 8B:
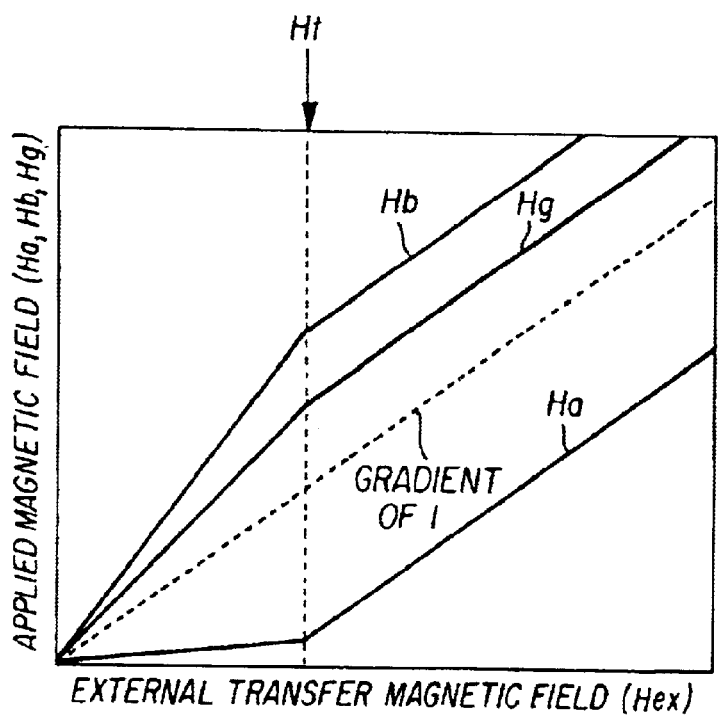
FIG. 8(b) schematically illustrates a graph of the distributions of the parallel components of the magnetic fluxes on the magnetic recording medium.

First, the magnetic transfer to the recording medium with the coercive force Hc1 applied with an external magnetic field Hex1 is explained. The initialization step conducted in advance of the magnetic transfer magnetizes the magnetic recording medium in one direction until the magnetization thereof saturates. As shown in the graph (A) of FIG. 1, excellent magnetic transfer is facilitated since the following relations hold between the recording magnetic fields Ha, Hb, and Hg generated by the magnetic field Hex1 applied to the master disk and the magnetic recording medium and the coercive force Hc1: Hb>Hc1, Hg>Hc1, and Ha<Hc1. As described with reference to FIGS. 8(a) and 8(b), Ha designates the recording magnetic field beneath the central portion of the soft magnetic pattern 3a, Hb the recording magnetic field at both ends of the soft magnetic pattern 3a, and Hg the recording magnetic field at the center of the region between the adjacent soft magnetic patterns 3a.

Second, the magnetic transfer to the recording medium with the coercive force Hc2 applied with an external magnetic field Hex2 is explained. As shown in the graph (B) of FIG. 1, excellent magnetic transfer is facilitated since the following relations hold true between the recording magnetic fields Ha, Hb, and Hg generated by the magnetic field Hex2 applied to the master disk and the magnetic recording medium and the coercive force Hc2: Hb>Hc2, Hg>Hc2, and Ha<Hc2.

Third, the magnetic transfer to the recording medium with the coercive force Hc1 applied with an external magnetic field Hex2 is explained. As shown in the graph (H) of FIG. 1, the following relations hold true between the recording magnetic fields Ha, Hb, and Hg generated by the magnetic field Hex2 applied to the master disk and the magnetic recording medium and the coercive force Hc1: Hb>Hc1, Hg>Hc1, and Ha>Hc1. Therefore, the magnetization in the magnetic recording medium aligned by the initial magnetization below the soft magnetic patterns 3a is also inverted by the magnetic transfer. When the external magnetic field Hex much higher than the coercive force Hc is applied to the master disk 3, the transfer signals cannot be written in the magnetic recording medium 1 since the magnetic recording medium 1 is magnetized uniformly opposite to the initial magnetization direction even if the master disk 3 is on the magnetic recording medium 1.

Fourth, the magnetic transfer to the recording medium with the coercive force Hc2 applied with an external magnetic field Hex1 is explained. As shown in the graph (G) of FIG. 1, the following relations hold true between the recording magnetic fields Ha, Hb, and Hg generated by the magnetic field Hex1 applied to the master disk and the magnetic recording medium and the coercive force Hc2: Hb<Hc2, Hg<Hc2, and Ha<Hc2. Therefore, the magnetization in the magnetic recording medium aligned by the initial magnetization is not inverted in the portion of the magnetic recording medium below the soft magnetic patterns 3a or in the portion of the magnetic recording medium above which no soft magnetic pattern 3a exists. In other words, the transfer signals cannot be written in the magnetic recording medium 1 since the initial magnetization is retained uniformly throughout the magnetic recording medium 1.

By appropriately combining the coercive forces Hc1 and Hc2 and the external magnetic fields Hex1 and Hex2, the soft magnetic patterns embedded in the master disk can be transferred independently to two recording layers included in the magnetic recording medium. The principle of the magnetic transfer will be described below with reference to FIGS. 2(a) through 2(c). In the following, the relations between the coercive force Hc1, the coercive force Hc2, the external magnetic field Hex1, and the external magnetic field Hex 2 are the same as those described above.

Figure 2A:
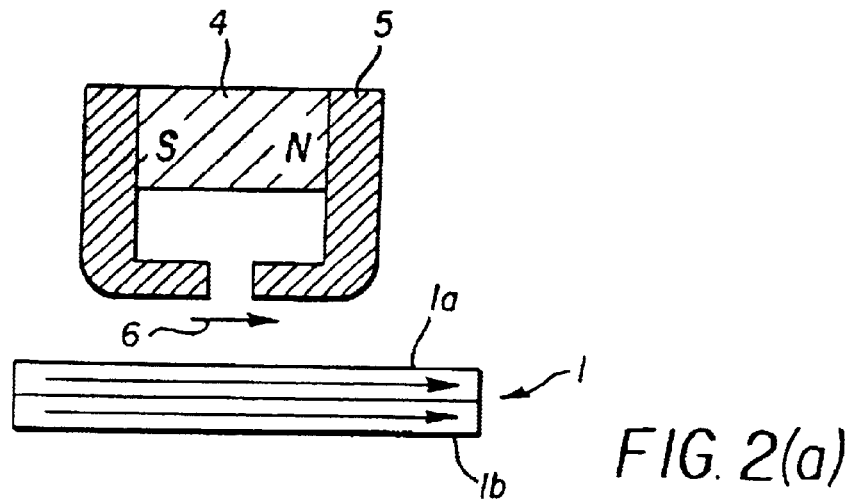
FIGS. 2(a) through 2(c) are schematic cross-sectional views illustrating the principle of magnetic transfer that combines the coercive forces Hc1 and Hc2 of two recording layers included in a magnetic recording medium and the external magnetic fields Hex1 and Hex2 for transferring the soft magnetic patterns embedded in the master disks independently to the respective recording layers.

FIG. 2(a) is a cross sectional view of the simplified magnetic recording medium describing the step of initial magnetization. The magnetic recording medium 1 includes an upper recording layer 1a with the coercive force Hc1 and a lower recording layer 1b with the coercive force Hc2. In the step of initial magnetization, the upper recording layer 1a and the lower recording layer 1b are initialized simultaneously with an external magnetic field Hex2, which is much higher than the coercive forces Hc1 and Hc2.

Figure 2B:
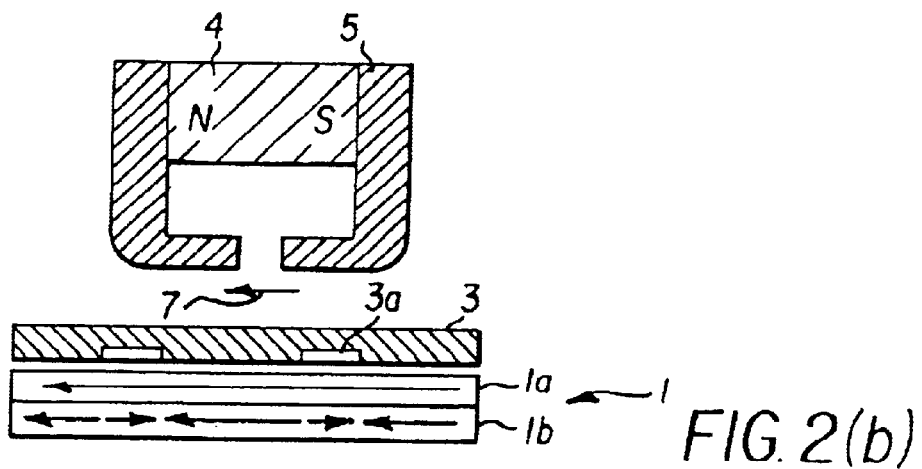

FIG. 2(b) is a cross sectional view describing the step of first magnetic transfer. A first master disk 3 is positioned above or on the magnetic recording medium 1. An external magnetic field Hex2 is applied in the direction opposite to that of the initializing magnetic field to the magnetic recording medium 1. The upper recording layer 1a with the coercive force Hc1 is magnetized uniformly in the opposite direction to that of the initial magnetization, as described previously. The soft magnetic patterns on the first master disk 3 are transferred exclusively to the lower recording layer 1b with the coercive force Hc2, as previously described.

Figure 2C:
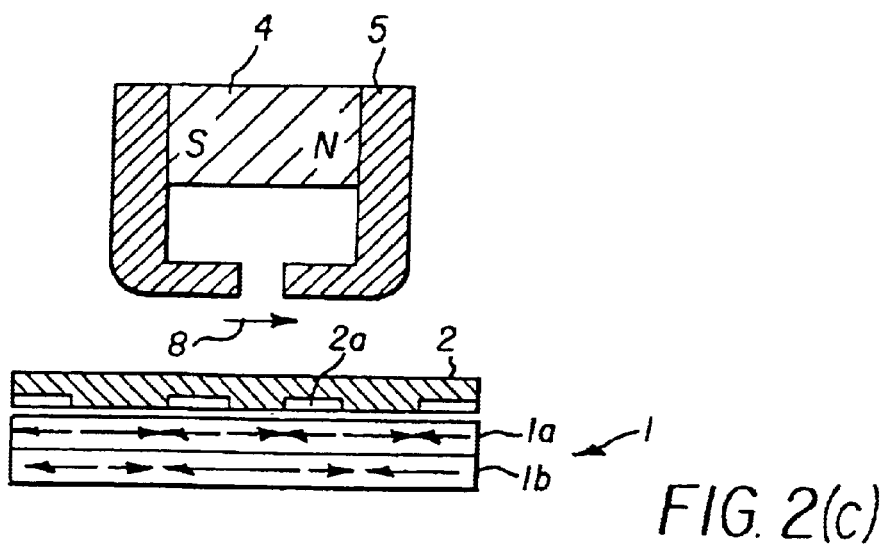

FIG. 2(c) is a cross sectional view describing the step of second magnetic transfer. The second master disk 2 is positioned preferably above or on the magnetic recording medium 1. An external magnetic field Hex1 is applied in the same direction as that of the initializing magnetic field to the magnetic recording medium 1. The soft magnetic patterns on the second master disk 2 are transferred exclusively to the upper recording layer 1a with the coercive force Hc1, as previously described. No soft magnetic pattern on the second master disk 3 is transferred by the external magnetic field Hex1 to the lower recording layer 1b with the coercive force Hc2, and the magnetization aligned before the second step of magnetic transfer is retained in the lower recording layer 1b, as previously described.

In sum, the magnetic transfer method described above includes the following steps of:

1) preparing a magnetic recording medium having an upper recording layer 1a with the coercive force Hc1, and a lower recording layer 1b with the coercive force Hc2;
2) setting the coercive forces Hc1 and Hc2 so that Hc1<Hc2;
3) applying an external magnetic field Hex2 that makes the following relations hold true, between the recording magnetic fields Ha, Hb, and Hg generated on the magnetic recording medium by the applied external magnetic field Hex2 and the coercive forces Hc1 and Hc2, Hb>Hc2, Hg>Hc2, Ha<Hc2, Hb>Hc1, Hg>Hc1, and Ha>Hc1, to transfer the soft magnetic patterns on a first master disk, not to the upper recording layer 1a, but exclusively to the lower recording layer 1b, and to magnetize the upper recording layer 1a uniformly opposite to the initial magnetization direction; and
4) applying an external magnetic field Hex1 that makes the following relations hold true, between the recording magnetic fields Ha, Hb and Hg generated on the magnetic recording medium by the applied external magnetic field Hex1 and the coercive forces Hc1 and Hc2, Hb<Hc2, Hg<Hc2, Ha<Hc2, Hb>Hc1, Hg>Hc1, and Ha<Hc1, to transfer the soft magnetic patterns on a second master disk exclusively to the upper recording layer 1a and to retain the magnetization in the lower recording layer 1b without being affected by the application of the external magnetic field Hex1.

Thus, the soft magnetic patterns embedded in the master disks are transferred independently to the recording layers of a magnetic recording medium by the first and second transfer steps 3) and 4) above.

Now the invention will be described more in detail below in connection with the specific embodiments.

Figure 3A:
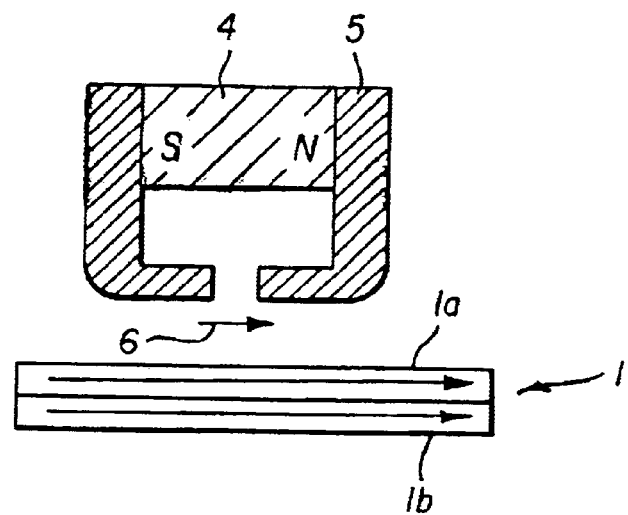
FIGS. 3(a) and 3(b) are schematic cross-sectional views illustrating the steps of magnetic transfer according to the first embodiment of the invention.
Figure 3B:
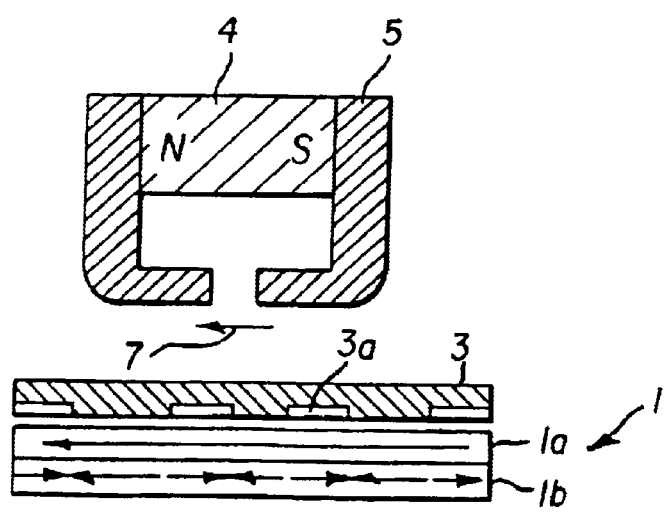

FIGS. 3(a) and 3(b) are cross-sectional views illustrating the steps of magnetic transfer according to a first embodiment of the invention. The magnetic transfer is conducted on a magnetic recording medium 1 having an upper recording layer 1a with the coercive force Hc1 of 3000 Oe, and a lower recording layer 1b with the coercive force Hc2 of 6000 Oe. According to the first embodiment, the soft magnetic patterns on a master disk 3 are transferred only to the lower recording layer 1b. In the initializing step shown in FIG. 3(a), the upper recording layer 1a and the lower magnetic layer 1b are magnetically initialized by applying an external initializing magnetic field of around 7000 Oe to the magnetic recording medium 1. In the transfer step shown in FIG. 3(b), the magnetic transfer is conducted by applying an external magnetic field Hex of 6000 Oe in the opposite direction of the initialization direction. The external magnetic field Hex magnetizes the upper recording layer 1a uniformly and transfers the soft magnetic patterns 3a on the master disk 3 only to the lower recording layer 1b. The soft magnetic patterns 3a on the master disk 3 are from 0.5 to 3 µm in line width, and the soft magnetic layers are 500 nm in thickness. The master disk includes a single crystal silicon substrate. The soft magnetic patterns are made of pure cobalt.

Figure 4A:
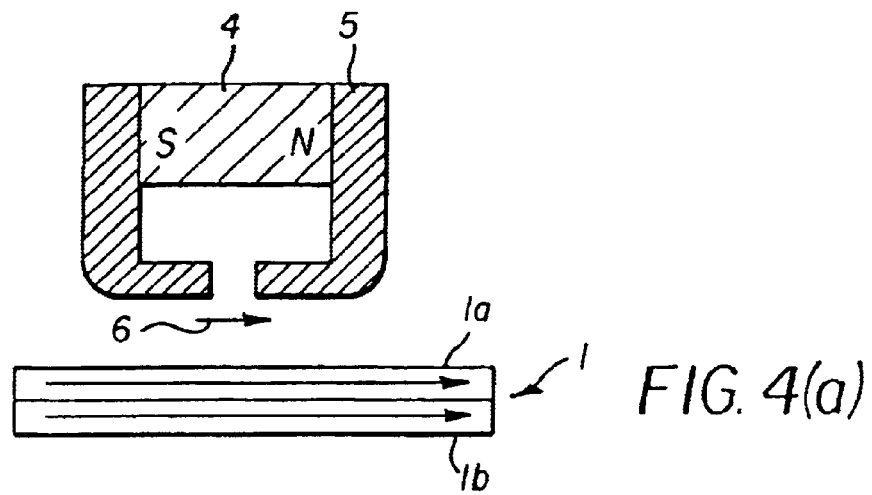
FIGS. 4(a) through 4(c) are schematic cross-sectional views illustrating the steps of magnetic transfer according to the second embodiment of the invention.
Figure 4B:
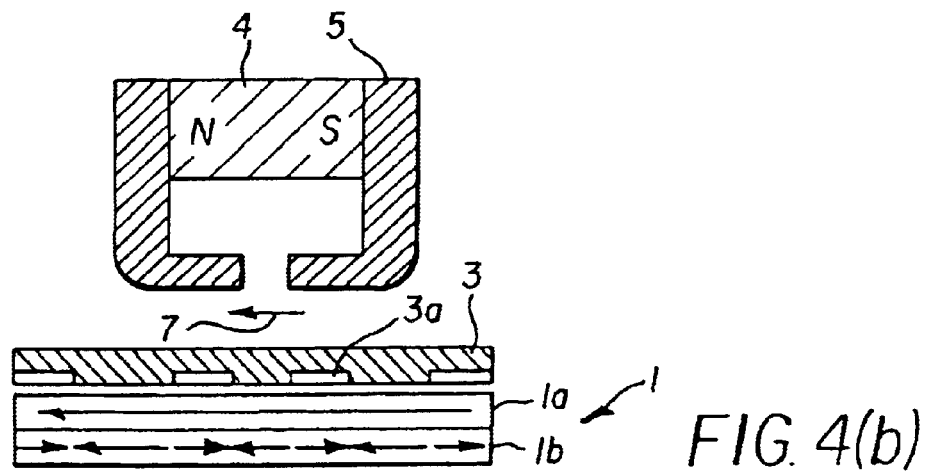
Figure 4C:
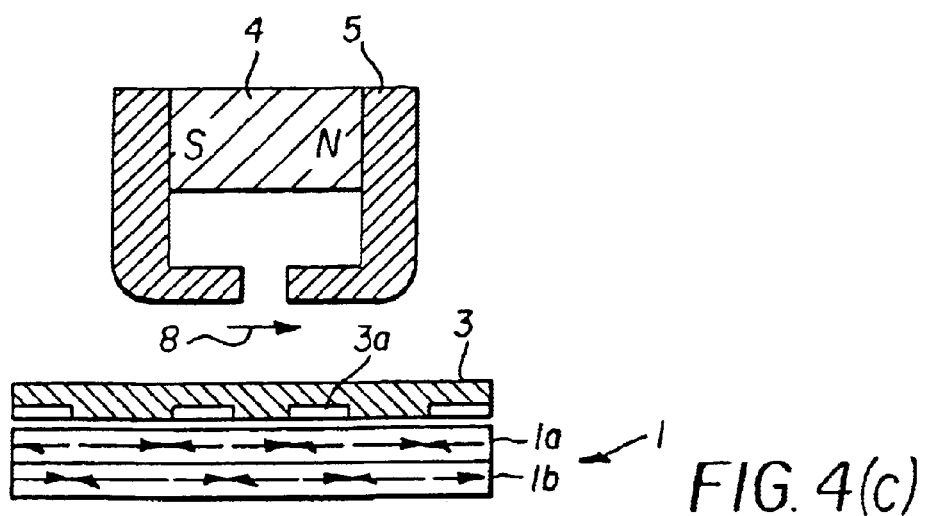

FIGS. 4(a) through 4(c) are cross sectional views illustrating the steps of magnetic transfer according to a second embodiment of the invention. The magnetic transfer is conducted on a magnetic recording medium 1 having an upper recording layer 1a with the coercive force Hc1 of 3000 Oe, and a lower recording layer 1b with the coercive force Hc2 of 6000 Oe, the same as in the first embodiment. According to the second embodiment, the soft magnetic patterns on a master disk 3 are transferred independently to the lower recording layer 1b through the first step of magnetic transfer and to the upper recording layer 1a through the second step of magnetic transfer.

Referring now to FIG. 4(a) describing the initializing step, the recording layers 1a and 1b are magnetically initialized by an external initializing magnetic field of around 7000 Oe. Referring now to FIG. 4(b) describing the first step of magnetic transfer, an external magnetic field of 6000 Oe is applied in the opposite direction of the initial magnetization direction. The upper recording layer 1a is magnetized uniformly in the opposite direction of the initial magnetization direction, and the soft magnetic patterns 3a on a master disk 3 are transferred only to the lower recording layer 1b. Referring now to FIG. 4(c) describing the second step of magnetic transfer, an external magnetic field of 3000 Oe is applied in the same direction as the initial magnetization direction. The magnetization in the lower recording layer 1b is unaffected, and the soft magnetic patterns 3a on a master disk 3 are transferred only to the upper recording layer 1a. According to the second embodiment, the same master disk is used in the first and second steps of magnetic transfer.

Figure 5A:
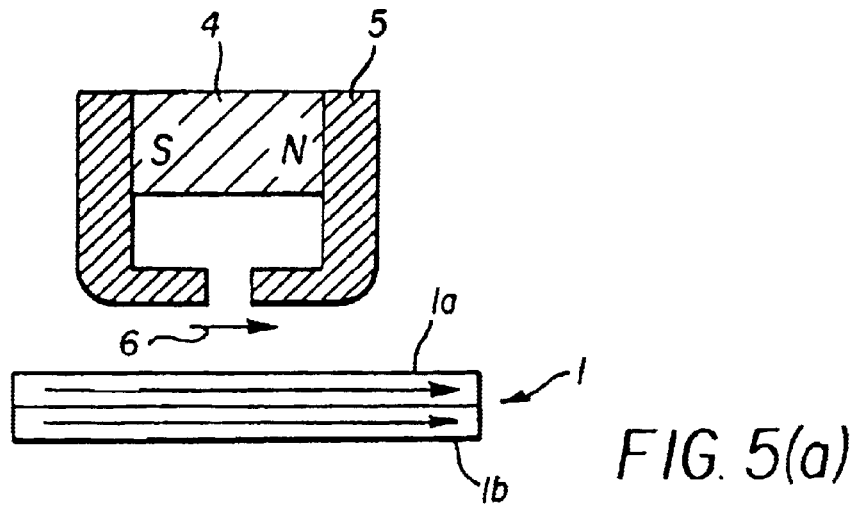
FIGS. 5(a) through 5(c) are schematic cross-sectional views illustrating the steps of magnetic transfer according to the third embodiment of the invention.
Figure 5B:
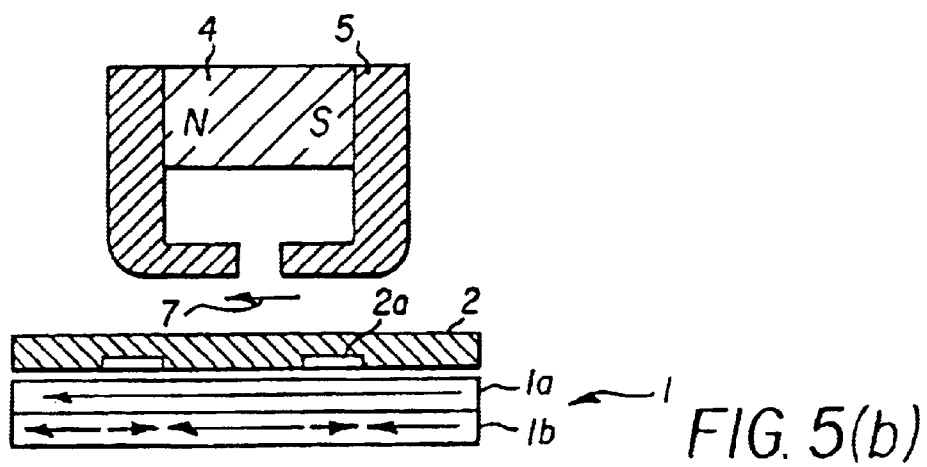
Figure 5C:
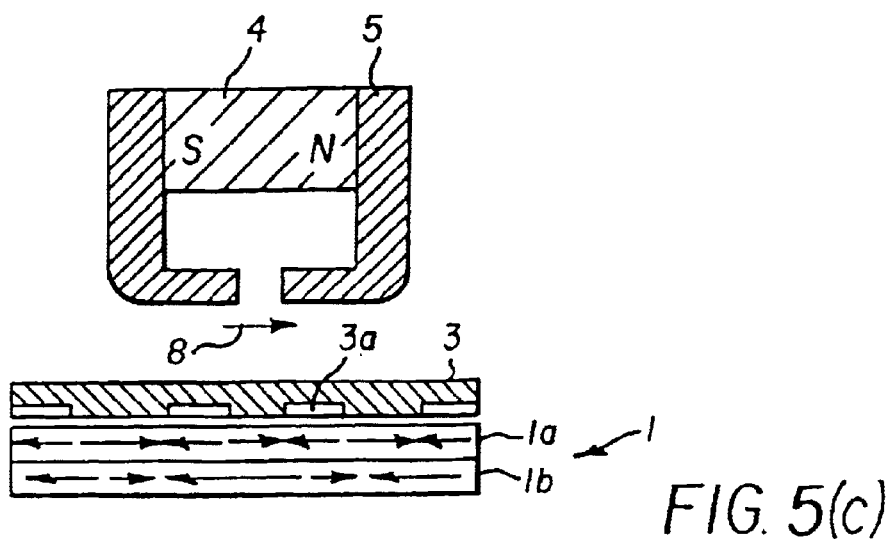

FIGS. 5(a) through 5(c) are cross sectional views illustrating the steps of magnetic transfer according to a third embodiment of the invention. According to the third embodiment, different master disks having different soft magnetic patterns embedded therein are used in the first and second steps of magnetic transfer. According to the third embodiment, the magnetic transfer is conducted on a magnetic recording medium 1 having an upper recording layer 1a with the coercive force Hc1 of 3000 Oe, and a lower recording layer 1b with the coercive force Hc2 of 6000 Oe, the same as in the first and second embodiments.

Referring now to FIG. 5(a) illustrating the initializing step, the recording layers 1a and 1b are magnetically initialized by an external initializing magnetic field of around 7000 Oe. Referring now to FIG. 5(b) illustrating the first step of magnetic transfer, an external magnetic field of 6000 Oe is applied in the opposite direction of the initial magnetization direction. The upper recording layer 1a is magnetized uniformly in the opposite direction of the initial magnetization direction, and the soft magnetic patterns 2a on a master disk 2 are transferred only to the lower recording layer 1b. Referring now to FIG. 5(c) illustrating the second step of magnetic transfer, the master disk 2 used in the first step of magnetic transfer is replaced with a master disk 3, and an external magnetic field of 3000 Oe is applied in the same direction as the initial magnetization direction. The magnetization in the lower recording layer 1b is unaffected, and the soft magnetic patterns 3a on a master disk 3 are transferred only to the upper recording layer 1a. By using different master disks in the first and second steps of magnetic transfer, the upper recording layer 1a in the magnetic recording medium 1 is employable, for example, for a data recording layer and the lower recording layer 1b for a servo signal storing layer storing the servo signals written therein without being erased during the data writing in the upper recording layer 1a.

Figure 6:
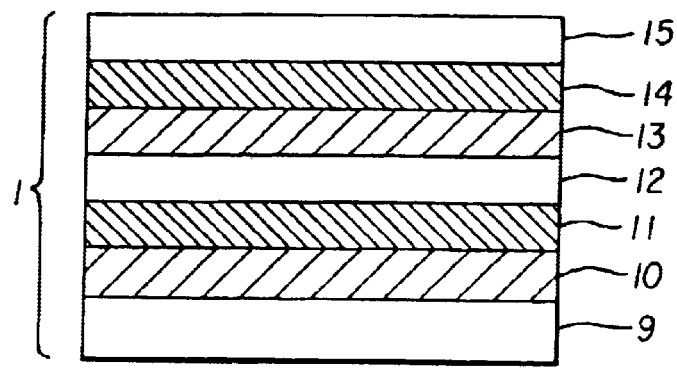
FIG. 6 illustrates a schematic cross-sectional view of a magnetic recording medium that has two recording layers according to the fourth embodiment of the invention.
Figure 7A:
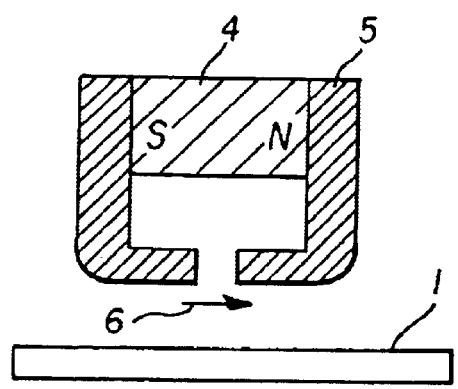
FIG. 7(a) is a schematic cross-sectional view illustrating a step of the conventional magnetic transfer.
Figure 7B:
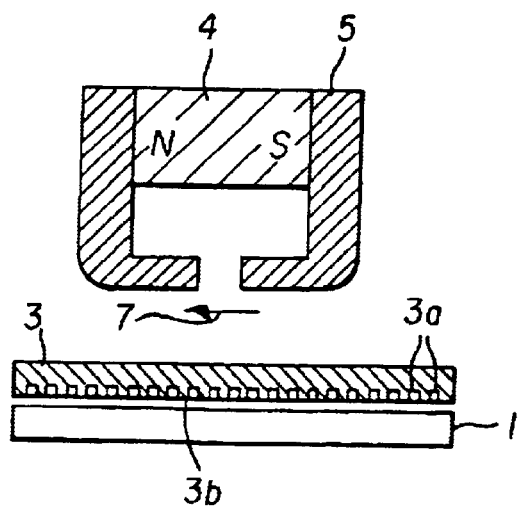
FIG. 7(b) is another schematic cross-sectional view illustrating another step of the conventional magnetic transfer.

FIG. 6 is a across sectional view of a magnetic recording medium having two recording layers according to a fourth embodiment of the invention. The magnetic recording medium according to the fourth embodiment includes a substrate 9 made of aluminum or glass, and a first nonmagnetic undercoating layer 10 of 10 nm in thickness formed by sputtering on the substrate 9. The first nonmagnetic undercoating layer 10 is formed to control the easy axes of magnetization in the recording layers. The first nonmagnetic undercoating layer 10 is made of an alloy such as CoCr, CoW, and CoTi.

The magnetic recording medium according to the fourth embodiment further includes a lower recording layer 11 formed on the first nonmagnetic undercoating layer 10. The lower recording layer 11 is a magnetic metal layer containing, for example, Co as the main component thereof and from several % to several teen % of an appropriate combination of Pt, Cr, Ta, and B added thereto (e.g., a magnetic alloy layer such as a CoCrPtTa layer and a CoCrPtB layer). The lower recording layer 11 corresponds to the lower recording layer 1b in FIGS. 2(a) through 5(c).

The magnetic recording medium according to the fourth embodiment further includes a nonmagnetic isolation layer 12 containing Co as the main component thereof, such as a CoCr layer, a CoW layer, and a CoTi layer, and a second nonmagnetic undercoating layer 13 containing Co as the main component thereof such as a CoCr layer, a CoW layer, and a CoTi layer. Although the second nonmagnetic undercoating layer 13 and the nonmagnetic isolation layer 12 are alloy layers containing Co as the main components thereof, the compositions and the contents thereof are different from each other.

The magnetic recording medium according to the fourth embodiment further includes an upper recording layer 14, which corresponds to the upper recording layer 1a in FIGS. 2(a) through 5(c), formed on the second undercoating layer 13. Although the upper recording layer 14 contains, Co as the main component thereof and an appropriate combination of Pt, Cr, Ta, and B added thereto in the same manner as the lower recording layer 11, the compositions of the metals added are different from those in the lower recording layer 11 to provide the upper recording layer 14 with a coercive force lower than that of the lower recording layer 11.

The magnetic recording medium according to the fourth embodiment further includes a carbon layer (carbon protection layer) 15 on the upper recording layer 14 to protect the upper recording layer 14 against corrosion or against wear caused by the friction with the magnetic head for writing data and for reading data.

As described above, the method of magnetic transfer according to the invention facilitates transferring different magnetic signals independently to two recording layers included in a magnetic recording medium. Therefore, the method of magnetic transfer according to the invention facilitates expanding the application fields of the magnetic printing technique in such a way that the upper recording layer can be used for a data recording layer and the lower recording layer for a servo signal storage layer that stores the servo signals written therein without being erased during the data writing in the upper recording layer.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-279907, in its entirety, including the drawings, claims, and the specification thereof, is incorporated herein by reference.

What is claimed is:

1. A method of magnetically transferring data to a magnetic recording medium comprising a first magnetic recording layer and a second magnetic recording layer below the first magnetic recording layer, the method comprising the steps of:

applying an initializing magnetic field parallel to the magnetic recording medium to magnetically initialize both the first and second recording layers;

positioning a first master disk in close proximity to or in close contact with the magnetic recording medium, the master disk comprising a nonmagnetic substrate comprising soft magnetic layers embedded in the surface portions thereof and shaped with respective line patterns or respective island patterns indicating first data; and applying a first transfer magnetic field to the first master disk and the magnetic recording medium in the opposite direction of the initializing magnetic field to transfer the first data from the first master disk to the second magnetic recording layer.

2. The method according to claim 1, further comprising the step of applying a second transfer magnetic field to the first master disk and the magnetic recording medium in the same direction of the initializing magnetic field to transfer the first data to the first magnetic recording layer.

3. The method according to claim 1, further comprising the steps of:

positioning a second master disk in close proximity to or in close contact with the magnetic recording medium, the second master disk comprising a nonmagnetic substrate comprising soft magnetic layers embedded in the surface portion thereof and shaped with respective line patterns or respective island patterns indicating second data; and applying a second transfer magnetic field to the second master disk and the magnetic recording medium in the same direction of the initializing magnetic field to transfer the second data to the first magnetic recording layer.

4. The method according to claim 2, wherein the strength of the first transfer magnetic field and the strength of the second transfer magnetic field are different from each other.

5. The method according to claim 3, wherein the strength of the first transfer magnetic field and the strength of the second transfer magnetic field are different from each other.

6. The method according to claim 1, wherein the coercive force of the first magnetic recording layer and the coercive force of the second magnetic recording layer are different from each other.

7. The method according to claim 4, wherein the coercive force (Hc1) of the first magnetic recording layer, the coercive force (Hc2) of the second magnetic recording layer, the strength (Hex2) of the first transfer magnetic field and the strength (Hex1) of the second transfer magnetic field are set so that the following relations hold true: Hc1<Hc2, Hex1<Hex2, Hc1<Hex2, and Hex1<Hc2.

8. The method according to claim 5, wherein the coercive force (Hc1) of the first magnetic recording layer, the coercive force (Hc2) of the second magnetic recording layer, the strength (Hex2) of the first transfer magnetic field and the strength (Hex1) of the second transfer magnetic field are set so that the following relations hold true: Hc1<Hc2, Hex1<Hex2, Hc1<Hex2, and Hex1<Hc2.

9. The method according to claim 8, wherein the first data are servo signals, and the patterns of the soft magnetic layers in the first master disk and the patterns of the soft magnetic layers in the second master disk are different from each other so that the servo signals recorded in the second magnetic recording layer are not erased during recording of the second data in the first magnetic recording layer.

10. The magnetic recording medium described in claim 1, further comprising one or more isolation layers between the first magnetic recording layer and the second magnetic recording layer, the one or more isolation layers comprising a nonmagnetic material.

* * * * *